(12) United States Patent
Chevalier

(10) Patent No.: US 7,431,131 B1
(45) Date of Patent: Oct. 7, 2008

(54) USER INTERFACE FOR BRAKING A VEHICLE

(75) Inventor: Mark Chevalier, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/444,805

(22) Filed: May 23, 2003

(51) Int. Cl.
*B60T 13/00* (2006.01)
*B60T 13/74* (2006.01)

(52) U.S. Cl. .................... 188/72.1; 303/9.61; 303/9.71

(58) Field of Classification Search ............... 303/9.61, 303/9.62, 9.64, 9.71, 9.72, 9.74; 188/72.2, 188/71.7, 72.1
See application file for complete search history.

(56) References Cited

U.S. PATENT DOCUMENTS

| | | | |
|---|---|---|---|
| 1,567,982 A | 12/1925 | Pfeiffer | |
| 1,606,224 A | 11/1926 | Hoeller | |
| 2,313,991 A * | 3/1943 | Fitch | .................. 188/355 |
| 3,159,974 A | 12/1964 | Rodgers | |
| 3,473,634 A | 10/1969 | Strifler et al. | |
| 3,486,591 A | 12/1969 | Scheffler | |
| 3,554,334 A | 1/1971 | Shimano | |
| 3,750,857 A | 8/1973 | Marschall et al. | |
| 3,868,001 A | 2/1975 | Yokoi | |
| 3,885,392 A | 5/1975 | Haraikawa | |
| 3,960,030 A | 6/1976 | Williams | |
| 3,999,807 A | 12/1976 | Haraikawa | |
| 4,024,932 A | 5/1977 | Fay | |
| 4,161,239 A | 7/1979 | Karasudani | |
| 4,174,867 A | 11/1979 | Oberthur | |
| 4,176,886 A | 12/1979 | Watanabe | |
| 4,189,190 A | 2/1980 | Luepertz | |
| 4,239,294 A | 12/1980 | Burgdorf | |
| 4,274,518 A | 6/1981 | Berisch | |
| 4,289,359 A | 9/1981 | Lupertz et al. | |
| 4,465,322 A | 8/1984 | Hayashi | |
| 4,494,800 A * | 1/1985 | Hayashi | ..................... 303/9.64 |
| 4,598,954 A * | 7/1986 | Hayashi | ..................... 303/9.61 |
| 5,036,960 A | 8/1991 | Schenk et al. | |
| 5,219,211 A | 6/1993 | Tsuchida et al. | |
| 5,273,346 A | 12/1993 | Tsuchida et al. | |
| 5,363,943 A | 11/1994 | Iwashita et al. | |
| 5,372,408 A | 12/1994 | Tsuchida et al. | |
| 5,501,511 A | 3/1996 | Wagner | |
| 5,544,946 A | 8/1996 | Toyoda et al. | |
| 5,564,534 A | 10/1996 | Toyoda et al. | |
| 5,620,237 A | 4/1997 | Iwashita et al. | |

(Continued)

FOREIGN PATENT DOCUMENTS

FR    2843349    2/2004

(Continued)

*Primary Examiner*—Melody M Burch
(74) *Attorney, Agent, or Firm*—Baker & Daniels LLP

(57) ABSTRACT

Methods and apparatus for decelerating and/or stopping a vehicle are disclosed. A vehicle in accordance with an exemplary embodiment of the invention may include a first wheel, a second wheel, and a brake system capable of applying a first braking force to the first wheel and a second braking force to the second wheel such that a ratio of the second braking force to the first braking force is equal to a pre-selected braking force ratio. The vehicle may also include a second brake input mechanism capable of varying the ratio of the second braking force to the first braking force.

39 Claims, 8 Drawing Sheets

U.S. PATENT DOCUMENTS

| | | |
|---|---|---|
| 5,628,387 A | 5/1997 | Schantzen |
| 5,971,499 A | 10/1999 | Pape et al. |
| 6,092,877 A | 7/2000 | Rasidescu et al. |
| 6,407,663 B1 | 6/2002 | Huggett |
| 6,478,103 B1 | 11/2002 | Matsuura |
| 6,772,864 B1 | 8/2004 | Luh |
| 6,802,400 B2 | 10/2004 | Ohura |
| 6,835,904 B2 | 12/2004 | McGuire et al. |
| 6,883,630 B2 | 4/2005 | Morin |
| 2002/0063010 A1 | 5/2002 | Morin |
| 2004/0035629 A1 | 2/2004 | Morin et al. |

FOREIGN PATENT DOCUMENTS

| | | |
|---|---|---|
| TW | 484550 | 4/2002 |
| TW | 243401 Y | 9/2004 |
| TW | 247468 Y | 10/2004 |

* cited by examiner

USER INTERFACE FOR BRAKING A VEHICLE

RELATED APPLICATIONS

The present application is related to U.S. patent application Ser. No. 10/444,394 entitled "Methods and Apparatus for Stopping a Vehicle" by the same inventor and filed on an even date herewith. The entire disclosure of the above mentioned application is hereby incorporated by reference.

FIELD OF THE INVENTION

The present invention relates generally to all terrain vehicles having a straddle-seat for accommodating a rider and a handlebar for receiving the hands of the rider. More particularly, the present invention relates to braking systems that are suitable for use with all terrain vehicles.

BACKGROUND OF THE INVENTION

In recent years, all terrain vehicles (ATVs) have gained widespread popularity. ATVs are commonly used in hunting, trail riding and utility applications such as the wide variety of maintenance activities which take place on a farm. Attachments are available for ATVs for use in utility applications such as plowing snow, mowing grass and hauling materials.

Perhaps the most common ATV application is trail riding. Trail riding on an ATV allows an ATV enthusiast to travel through areas which are not accessible by ordinary automobiles. Modern ATVs, can cover ground very rapidly and can cover great distances. During such long rides, an ATV may be used to carry a rider through a wide variety of terrain. Terrain which may be encountered includes forests, swamps, and deserts. Frequently ATVs are called upon to travel across rugged terrain at relatively high speeds. The braking system of an ATV may be called upon to bring the ATV to a stop in situations which vary greatly from one another.

SUMMARY OF THE INVENTION

The present invention relates generally to all terrain vehicles having a straddle-seat for accommodating a rider and a handlebar for receiving the hands of the rider. More particularly, the present invention relates to braking systems that are suitable for use with all terrain vehicles. A braking system in accordance with an exemplary implementation of the present invention comprises a first master piston disposed within a piston chamber defined by a first piston housing. In some implementations, the first piston housing has an output chamber defined in part by an output surface of the first master piston. The braking system also includes a second master piston disposed within a piston chamber defined by a second piston housing. The second piston housing comprises an output chamber defined in part by an output surface of the second master piston and an input chamber defined in part by an input surface of the second master piston. The output chamber of the first piston housing is fluidly connected to the input chamber of the second piston housing. A first input mechanism may be provided for applying a first input force to the first master piston for producing a first pressure within the output chamber of the first piston housing and within the input chamber of the second piston housing. The first input mechanism may comprise, for example, a lever. During operation, the first pressure may act on the input surface of the second master piston to produce a second pressure in the output chamber of the second piston housing.

The input surface of the second piston has a first area and the output surface of the second piston has a second area. In some useful implementations, the first area is different from the second area, for example, the first area may be smaller than the second area. In some particularly useful implementations, a ratio of the first area to the second area is selected as a function of a wheel base distance of the vehicle. Also in some particularly useful implementations, a ratio of the first area to the second area is selected as a function of a height of a centroid of the vehicle. In some especially useful implementations, the ratio of the first area to the second area is selected as a function of a height of a center of a combined mass of the vehicle and a typical vehicle rider.

In some useful implementations, a ratio of the first area to the second area is greater than about 0.3 and less than about 0.9. In some advantageous implementation, a ratio of the first area to the second area is greater than about 0.4 and less than about 0.8.

In some implementations, a second input mechanism is provided for applying a second input force to the second master piston. When this is the case, the second input force and the first pressure may act on the second master piston to produce a second pressure in the output chamber of the second piston housing.

In some implementations, the first piston housing and the second piston housing may be disposed on a handlebar of the vehicle. When this is the case, the first input mechanism may be advantageously positioned and dimensioned to interface with a first hand of a vehicle rider and the second input mechanism may be positioned and dimensioned to interface with a second hand of the vehicle rider. In some implementations, the first piston housing may be attached to a handlebar and the second piston housing may be attached to a chassis of a vehicle. When this is the case, the first input mechanism may be positioned and dimensioned to interface with a hand of a vehicle rider and the second input mechanism may be positioned and dimensioned to interface with a foot of the vehicle rider.

A vehicle in accordance with an exemplary embodiment of the invention may include a first wheel and a first brake assembly capable of applying a first braking force to the first wheel. The vehicle may further include a second brake assembly capable of applying a second braking force to the second wheel. In certain advantageous embodiments, the vehicle includes a first brake input mechanism capable of actuating the first brake assembly and the second brake assembly such that a ratio of the second braking force to the first braking force is equal to a pre-selected braking force ratio. The vehicle may also include a second brake input mechanism capable of varying the ratio of the second braking force to the first braking force.

In some cases, the ratio of the second braking force to the first braking force may vary as a function of a displacement of the second input mechanism. For example, in some implementations, the second braking force to the first braking force is less than 1.0 when the first brake input mechanism is urged toward a depressed position while the second brake input mechanism disposed in a resting position, and the ratio is greater than 1.0 when the second brake input mechanism is urged towards the depressed position while the first brake input mechanism is being urged toward a depressed position. By way of an additional example, the ratio of the second braking force to the first braking force may be less than about one when the first brake input mechanism is urged toward a depressed position while the second brake input mechanism disposed in a resting position, and the ratio of the second braking force to the first braking force can be made larger when the second brake input mechanism is urged towards the depressed position while the first brake input mechanism is being urged toward a depressed position.

A vehicle in accordance with the present invention may also include a first brake caliper assembly for braking a first wheel of a vehicle. The first brake caliper assembly may include a first brake housing defining an input chamber of the first brake housing that is fluidly connected to the output chamber of the first piston housing. The brake system may also include a first reservoir selectively communicating with the output chamber of the first piston housing so as to replenish a fluid disposed therein to compensation for pad wear in the first brake caliper assembly.

A vehicle in accordance with the present invention may also include a second brake caliper assembly for braking a second wheel of a vehicle. The second brake caliper assembly may include a second brake housing defining an input chamber of the second brake housing that is fluidly connected to the output chamber of the second piston housing. The brake system may also include a second reservoir selectively communicating with the output chamber of the second piston housing so as to replenish a fluid disposed therein to compensation for pad wear in the second brake caliper assembly.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
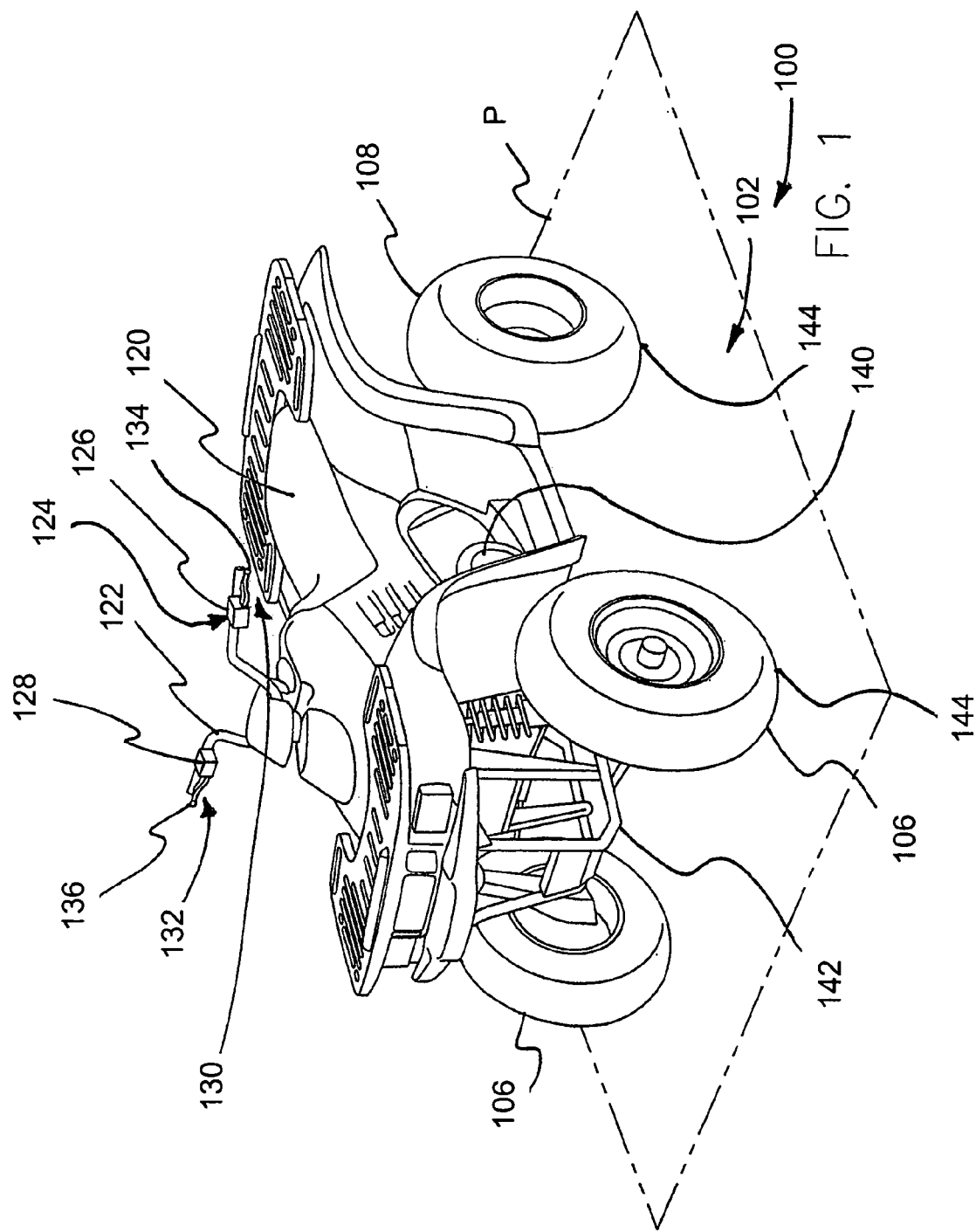
FIG. 1 is an isometric view of an ATV in accordance with an exemplary embodiment of the present invention.

FIG. 1 is a perspective view illustrating a left side 102 of an ATV 100 in accordance with an exemplary embodiment of the present invention. In the embodiment of FIG. 1, ATV 100 has two front wheels 106 and two rear wheels 108. ATV 100 also includes a straddle-type seat 120 and a handlebar 122 for use by a rider of ATV 100. Handlebar 122 may be used for steering ATV 100. In the embodiment of FIG. 1, ATV 100 includes a braking system 124 that is capable of selectively precluding rotation of front wheels 106 or rear wheels 108 or both. In the embodiment of FIG. 1, braking system 124 includes a first piston housing 126 and a second piston housing 128. In the embodiment of FIG. 1, first piston housing 126 and second piston housing 128 are both attached to handlebar 122.

Braking system 124 also includes a first input mechanism 130 that is capable of applying a first input force to a first master piston disposed within first piston housing 126. In the embodiment for FIG. 1, first input mechanism 130 comprises a first lever 134. In the embodiment of FIG. 1, first lever 134 is positioned and dimensioned to receive the left hand of a vehicle rider.

Braking system 124 of vehicle 138 also includes a second input mechanism 132 comprising a second lever 136. In the embodiments of FIG. 1, second lever 136 is positioned and dimensioned to receive the right hand of a vehicle rider. Second lever 136 is preferably capable of applying in input force to a piston disposed within a second piston housing 128.

An engine 140 of ATV 100 may be used to power each rear wheel 108, and in some cases also each front wheel 106. In the embodiment of FIG. 1, engine 140 and seat 120 are both preferably coupled to a frame 142 of ATV 100. As shown in FIG. 1, each of front wheel 106 has a momentary contact point 144. Likewise, each of rear wheel 108 has a momentary contact point 144. The momentary contact points of the wheels define a wheel contact plane P.

In the embodiment of FIG. 1, each front wheel 106 is coupled to frame 142 by a front suspension and each rear wheel 108 is coupled to frame 142 by a rear suspension. In a preferred embodiment, each suspension is adapted to deflect so that the wheels can travel between a full compression position and a full extension position. In the embodiment of FIG. 1, each wheel is shown in an intermediate position lying between the full extension position and the full compression position. Various intermediate positions are possible without deviating from the spirit and scope of the present invention. For example, one intermediate position may be found when ATV 100 is at rest and the weight of ATV 100 is supported at least in part by the suspensions and wheels. Another example of an intermediate position may be found when ATV 100 is at rest and the weight of both a rider and ATV 100 are supported at least in part by the suspensions and wheels.

Figure 2:
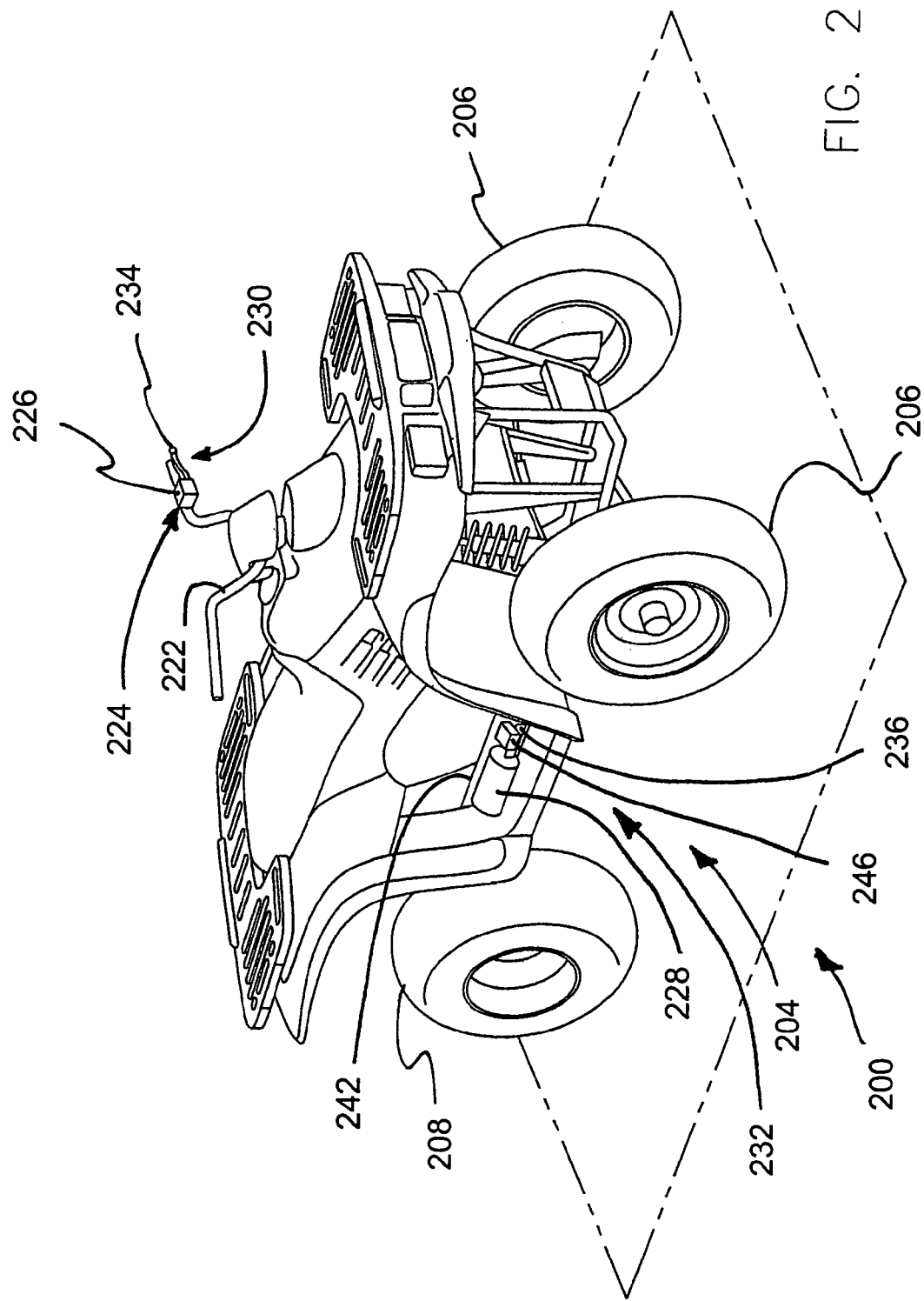
FIG. 2 is an isometric view illustrating a right side 204 of an ATV 200 in accordance with an additional embodiment of the present invention.

FIG. 2 is an isometric view illustrating a right side 204 of an ATV 200 in accordance with an additional embodiment of the present invention. In the embodiment of FIG. 2, ATV 200 includes a braking system 224 that is capable of selectively precluding rotation of front wheels 206 or rear wheels 208 or both. In the embodiment of FIG. 2, braking system 224 includes a first piston housing 226 and a second piston housing 228. In the embodiment of FIG. 2, first piston housing 226 is attached to a handlebar 222 of ATV 200. Braking system 224 also includes a first input mechanism 230 that is capable of applying a first input force to a first master piston disposed within first piston housing 226. In the embodiment for FIG. 2, first input mechanism 230 comprises a first lever 234. In the embodiment of FIG. 2, first lever 234 is positioned and dimensioned to receive the left hand of a vehicle rider.

In the embodiment of FIG. 2, braking system 224 also includes a second input mechanism 232 comprising a second lever 236. A foot peddle 246 is fixed to second lever 236 in the embodiment of FIG. 2. In preferred embodiment, second lever 236 is capable of applying force to a piston disposed within a second piston housing 228. In the embodiment of FIG. 2, second input mechanism 232 is positioned and dimensioned so as to receive the right foot of a vehicle rider. In the embodiment of FIG. 2, second piston housing 228 is shown attached to a frame 242 of ATV 200.

In some useful embodiments of the present invention, first piston housing 228 and first input mechanism 230 are capable of applying a first braking force to each front wheel 206 and a second braking force to each rear wheel 208. In some particularly useful embodiments of the present invention, first piston housing 226 and first input mechanism 230 are capable of actuating a first brake assembly and a second brake assembly such that a ratio of the first braking force to the second braking force is equal to a pre-selected braking force ratio. Also in some embodiments of the present invention, second piston housing 228 and second input mechanism 232 is capable of varying the ratio of the second braking force to the first braking force. In some embodiments of the present invention, first input mechanism 230 and second input mechanism 232 may be used alone or in conjunction to control braking of ATV 200.

Figure 3:
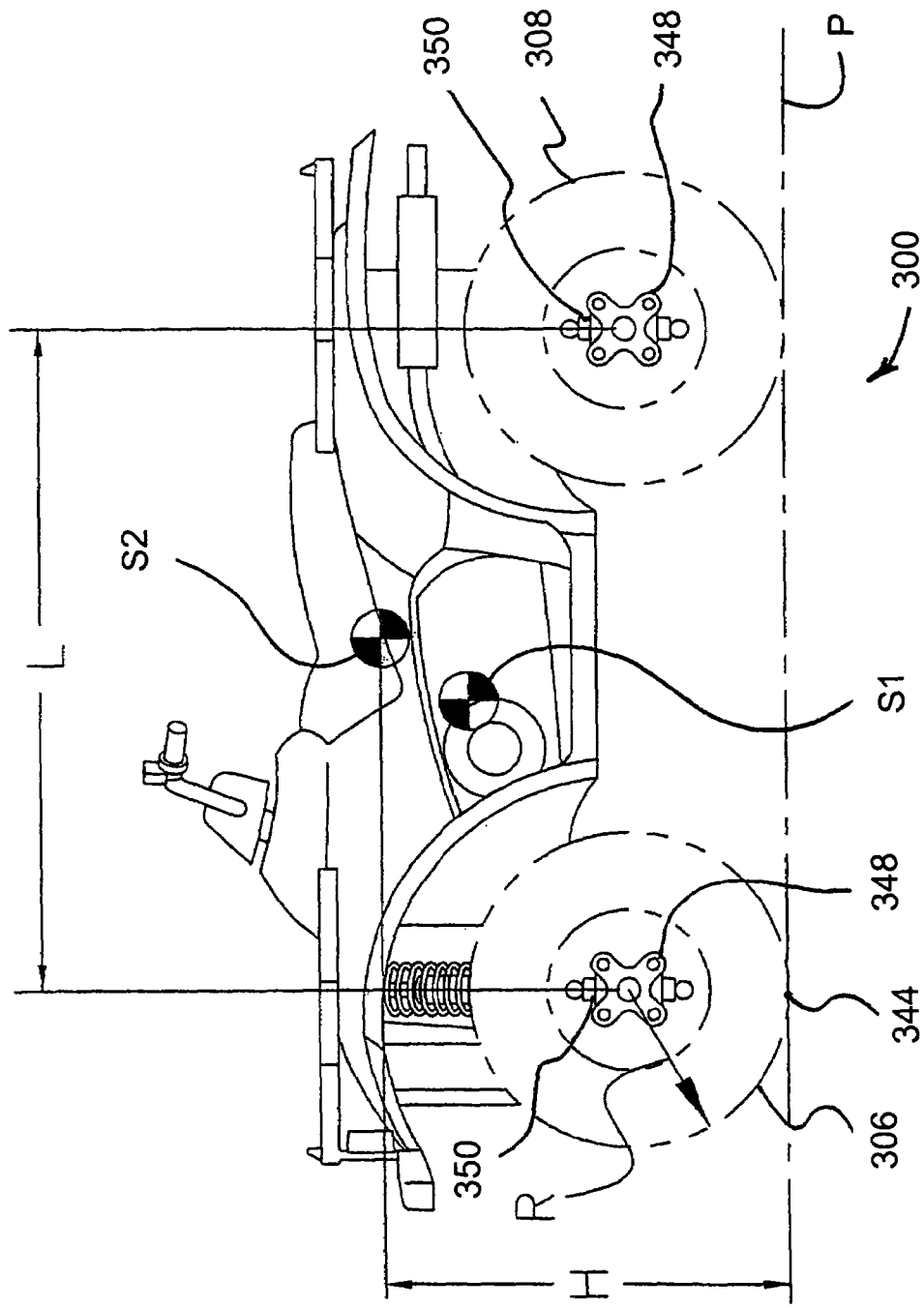
FIG. 3 is a side view of an ATV 300 in accordance with an exemplary embodiment of the present invention.

FIG. 3 is a side view of an ATV 300 in accordance with an exemplary embodiment of the present invention. In FIG. 3, a first symbol S1 and a second symbol S2 are shown overlaying ATV 300. First symbol S1 illustrates the approximate location of the center of mass of ATV 300. Second symbol S2 illustrates the approximate location of a center of the combined mass of ATV 300 and an ATV rider.

ATV 300 of FIG. 3 preferably includes two front wheels and two rear wheels. One front wheel 306 and one rear wheel 308 of ATV 300 are shown in the side view of FIG. 3. Front wheel 306 and rear wheel 308 have a rolling axis. In the embodiment of FIG. 3, the rolling axis of front wheel 306 is separated from the rolling axis of rear wheel 308 by a wheel base distance L. Front wheel 306 and rear wheel 308 each have a momentary contact point 344. The momentary contact points of the wheels define a wheel contact plane P. In FIG. 3 it may be appreciated that the center of the combined mass of ATV 300 and the ATV rider is located a distance H above a momentary contact point 344 of a front wheel 306 of ATV 300.

In the embodiment of FIG. 3, front wheel 306 and rear wheel 308 are each fixed to a hub 348 that is rotatably supported by a wheel carrier 350. In the embodiment of FIG. 3, front wheel 306 has a radius R. In some useful embodiments, ATV 300 has an L:R ratio between about 1 and 7. In some advantageous embodiments, ATV 300 has an L:R ratio between about 2 and 6. In some particularly advantageous embodiments, ATV 300 has an L:R ratio between about 3 and about 5.

Figure 4:
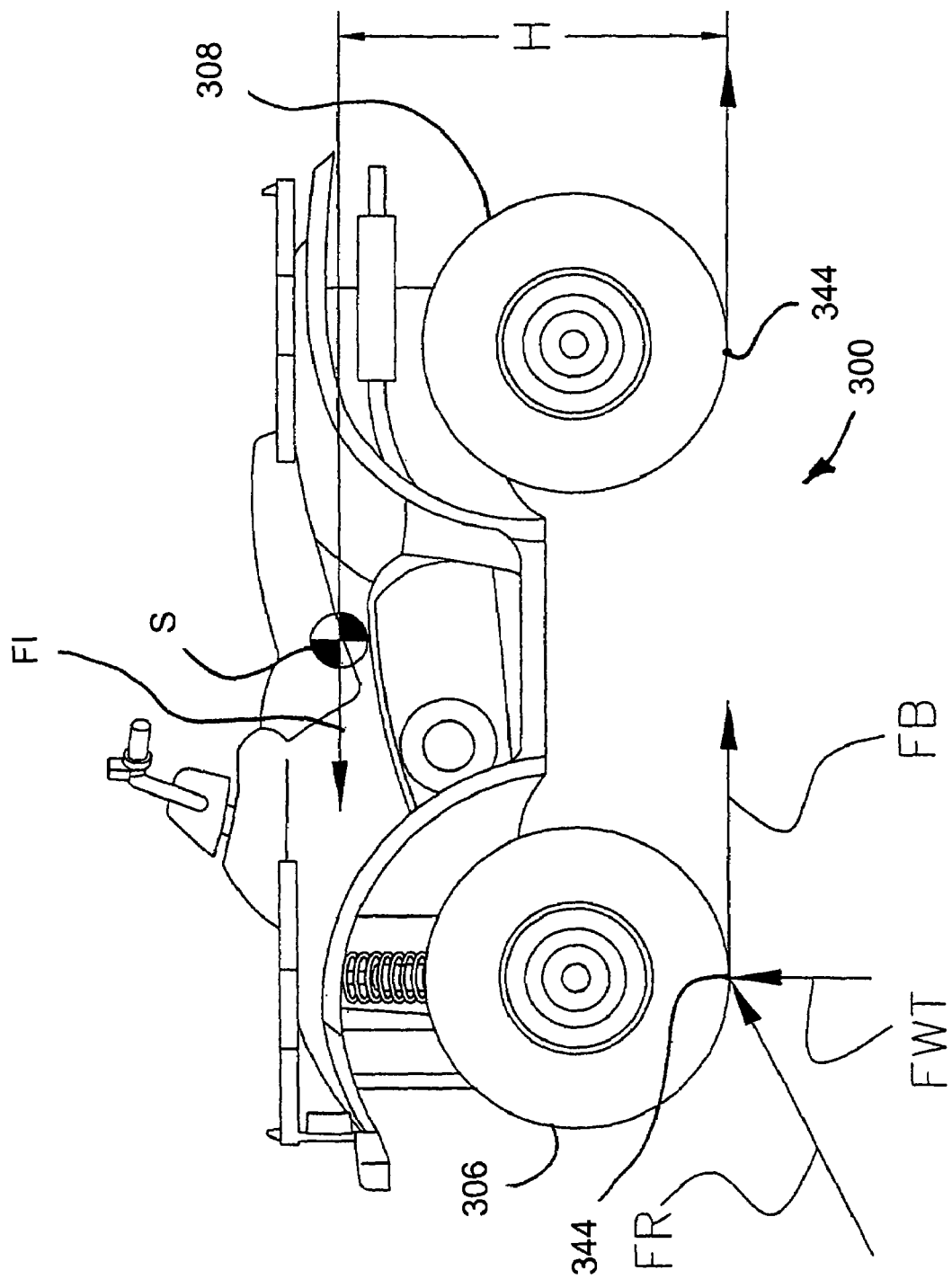
FIG. 4 is an additional side view of ATV 300 shown in the previous figure.

FIG. 4 is an additional side view of ATV 300 shown in the previous figure. In FIG. 4, a symbol S is shown overlaying ATV 300. Symbol S illustrates the approximate location of the centroid of ATV 300. In FIG. 4, a reference arrow FI is shown extending from symbol S in a forward direction. In the embodiment of FIG. 4, reference arrow FI represents the inertia of ATV 300 and an ATV rider while they are traveling in a forward direction.

A plurality of forces which are present during deceleration of ATV 300 are illustrated with arrows in FIG. 4. In FIG. 4, a second reference arrow FB is shown extending from front wheel 306 in a generally rearward direction. Reference arrow FB represents the braking force applied to front wheel 306 during braking of ATV 300 while ATV 300 is traveling in a forward direction.

During braking of ATV 300 the weight supported by front wheel 306 may increase due to the inertia the rider and ATV 300. The additional downward force applied to front wheel 306 during braking may be balanced by a reactionary force provided by the ground beneath the front wheels. In FIG. 4, this reactionary force is illustrated with a reference arrow labeled FWT.

FIG. 4 also includes a third reference arrow FR. Third reference arrow FR represents the combined effect of braking force FB and reactionary force FWT. With continuing reference to FIG. 4, a balance of moments may be taken about momentary contact point 344 of rear wheel 308. Because force FI is disposed a distance H above momentary contact point 344 of front wheel 306, this force vector will create a moment MA about momentary contact point 344 of front wheel 306. The magnitude of this moment may be expressed as follows:

$$MA = FI \times H \quad \text{(Equation 1)}$$

In FIG. 4, it may be appreciated that weight transfer force WTF is applied to ATV 300 at momentary contact point 344 of front wheel 306 which is separated from momentary contact point 344 of rear wheel 308 by a wheel base distance L. Accordingly, the magnitude of the resulting moment MB about momentary contact point 344 of rear wheel 308 may be expressed as follows:

$$MB = WTF \times L \quad \text{(Equation 2)}$$

With reference to FIG. 4, it may be appreciated that when MA and MB are equal and opposite, momentary contact point 344 of rear wheel 308 will not rotate relative to momentary contact point 344 of rear wheel 308. This relationship is reflected in the expression below:

$$MA = MB \quad \text{(Equation 3)}$$

Equation x and equation x may be substituted into equation x to yield the expression:

$$AF \times H = WTF \times L \quad \text{(Equation 4)}$$

Solving for WTF yields the following expression.

$$WTF = (H/L) * AF \quad \text{(Equation 5)}$$

From the expression above, it will be understood that the magnitude of WTF varies as a function of H/L. During braking of ATV 300 the downward force applied to front wheels 306 may be greater than the downward force applied to rear wheels 308. Because the normal force on the front wheels is greater than the normal force on the rear wheels, in some applications, it may be desirable to apply a greater braking force to the front wheels in these applications. The desired difference between the front braking force and the rear braking force may change depending upon the present riding conditions. A vehicle in accordance with some embodiments of the present invention provides a pre-selected ratio of front braking force and rear braking force when a first input device is actuated. The braking force ratio may be changed, however, when a second input mechanism is actuated. In some cases, the preselecting braking force ratio is selected as a function of a wheel based distance of a vehicle including a braking system in accordance with the present invention. For example, the pre-selected braking force ratio may be a function of H/L of ATV 300 shown in FIG. 4. In some embodiments, the pre-selected braking force ratio is selected as a function of a height of a center of a combined mass of a vehicle and a typical vehicle rider. In some additional embodiments, the pre-selected braking force ratio is selected as a function of a height of a centroid of a vehicle.

Figure 5:
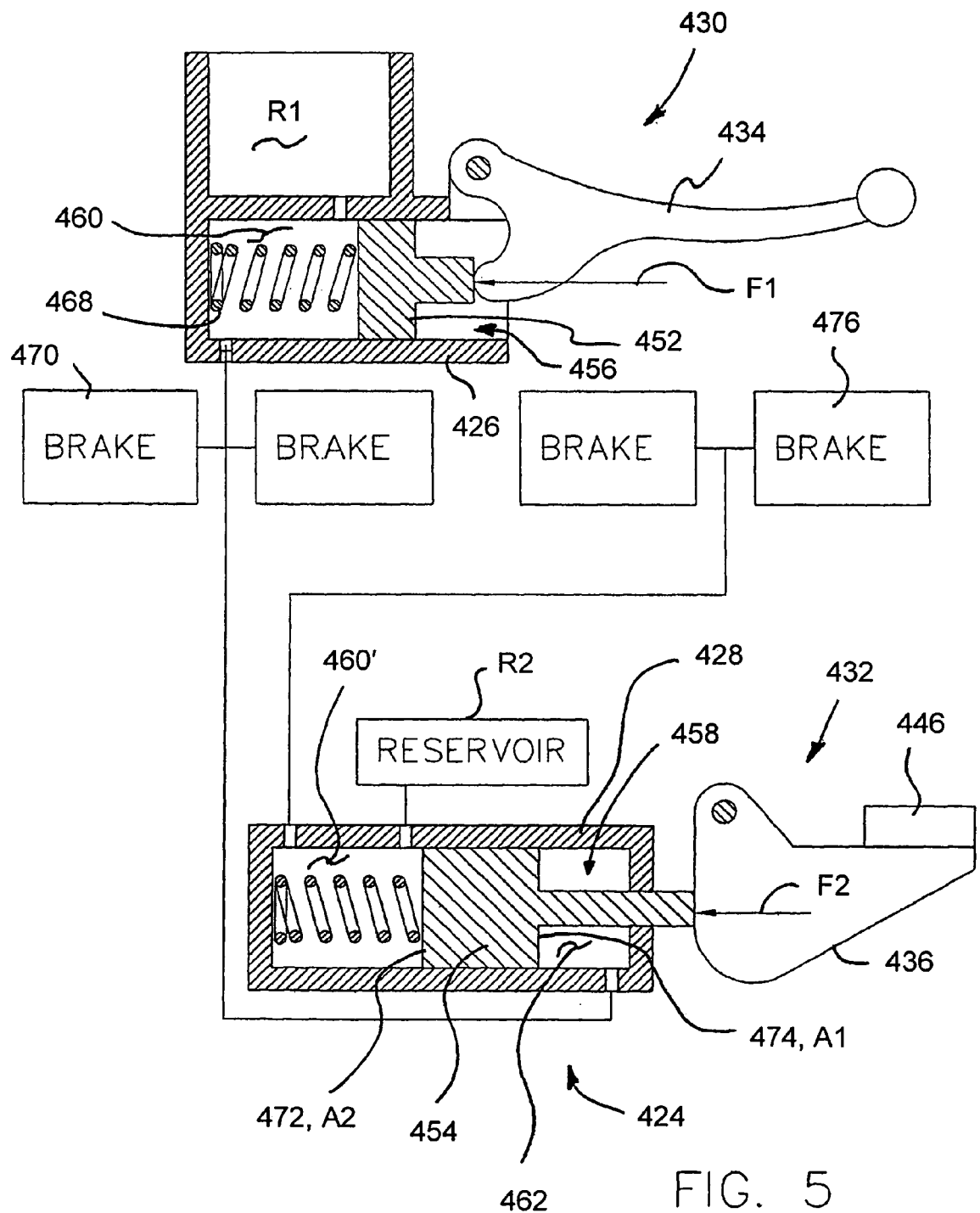
FIG. 5 is a diagrammatic representation of a braking system 424 in accordance with an exemplary embodiment of the present invention.

FIG. 5 is a diagrammatic representation of a braking system 424 in accordance with an exemplary embodiment of the present invention. Braking system 424 comprises a first master piston 452 disposed within a first piston chamber 456 defined by a first piston housing 426. First piston housing 426 has an output chamber 460 defined in part by an output surface of first master piston 452. In the embodiment of FIG. 5, a first spring 468 is disposed in output chamber 460. First spring 468 exerts a return force on first master piston 452.

Braking system 424 includes a first brake 470 that is fluidly connected to output chamber 460 defined by first piston chamber 456. A first reservoir R1 is arranged to selectively communicate with output chamber 460 of first piston housing 426 for replenishing a fluid disposed in output chamber 460, for example, to compensate for wear in the components of first brake 470.

Braking system 424 also includes a second master piston 454 disposed within a second piston chamber 458 defined by a second piston housing 428. Second piston housing 428 has an output chamber 460' defined in part by an output surface 472 of second master piston 454 and an input chamber 462' defined in part by an input surface 474' of second master piston 454. In the embodiment of FIG. 5, input chamber 462' of second piston housing 428 is fluidly connected to output chamber 460 of first piston housing 426 via a conduit.

In the embodiment of FIG. 5, braking system 424 includes a first input mechanism 430. In a preferred embodiment, first input mechanism 430 is capable of applying a first input force F1 to first master piston 452 for producing a first pressure within output chamber 460 of first piston housing 426. Because, in the embodiment of FIG. 5, first piston housing 426 is fluidly connected to input chamber 462' of second piston housing 428 via a conduit, the first pressure is also present in input chamber 462' of second piston housing 428. In the embodiment of FIG. 5, first input mechanism 430 comprises a first lever 434.

The first pressure may advantageously act on input surface 474' of second master piston 454 to produce a second pressure in output chamber 460' of second piston housing 428. In FIG. 5, it may be appreciated that input surface 474' of second master piston 454 has a first area A1, and output surface 472 of second master piston 454 has a second area A2.

In some advantageous embodiments of the present invention, first area A1 is different from second area A2. With reference to FIG. 5, it will be appreciated that first area A1 is generally smaller than second area A2 in the embodiment shown.

In some exemplary embodiments of the present invention, a ratio of first area A1 to second area A2 is selected as a function of a wheel base distance of a vehicle. Additionally, a ratio of first area A1 to second area A2 may be selected as a function of a height of a centroid related to a vehicle and/or a vehicle rider. In some useful embodiments of the present invention, a ratio of first area A1 to second area A2 is greater than about 0.3 and less than about 0.9. In some particularly useful embodiments of the present invention, a ratio of first area A1 to second area A2 is greater than about 0.4 and less than about 0.8.

Braking system 424 of FIG. 5 also includes a second input mechanism 432. In the embodiment of FIG. 5, second input mechanism 432 includes a second lever 436. A foot peddle 446 is fixed to second lever 436 in the embodiment of FIG. 5. In the embodiment of FIG. 5, second input mechanism 432 is arranged to apply a second input force F2 to second master piston 454. In some advantageous implementations of the present invention, second input mechanism 432 is capable of varying the ratio of a second braking force to a first braking force.

Braking system 424 includes a second brake 476 that is fluidly connected to output chamber 460 defined by second piston chamber 458 via a conduit. A second reservoir R2 is arranged to selectively communicate with output chamber 460' of second piston housing 428 for replenishing a fluid disposed in output chamber 460', for example, to compensate for pad wear in the second brake 476.

A vehicle operator may provide input to braking system 424 by depressing first lever 434 and/or second lever 436. In the embodiment of FIG. 5, second brake 476 can be actuated by depressing second lever 436 and leaving first lever 434 untouched. Alternately, first brake 470 and second brake 476 can be activated simultaneously (with a pre-selected braking force ratio) by depressing first lever 434 and leaving second lever 436 untouched. The braking force ratio can be selectively altered by depressing second lever 436.

Figure 6:
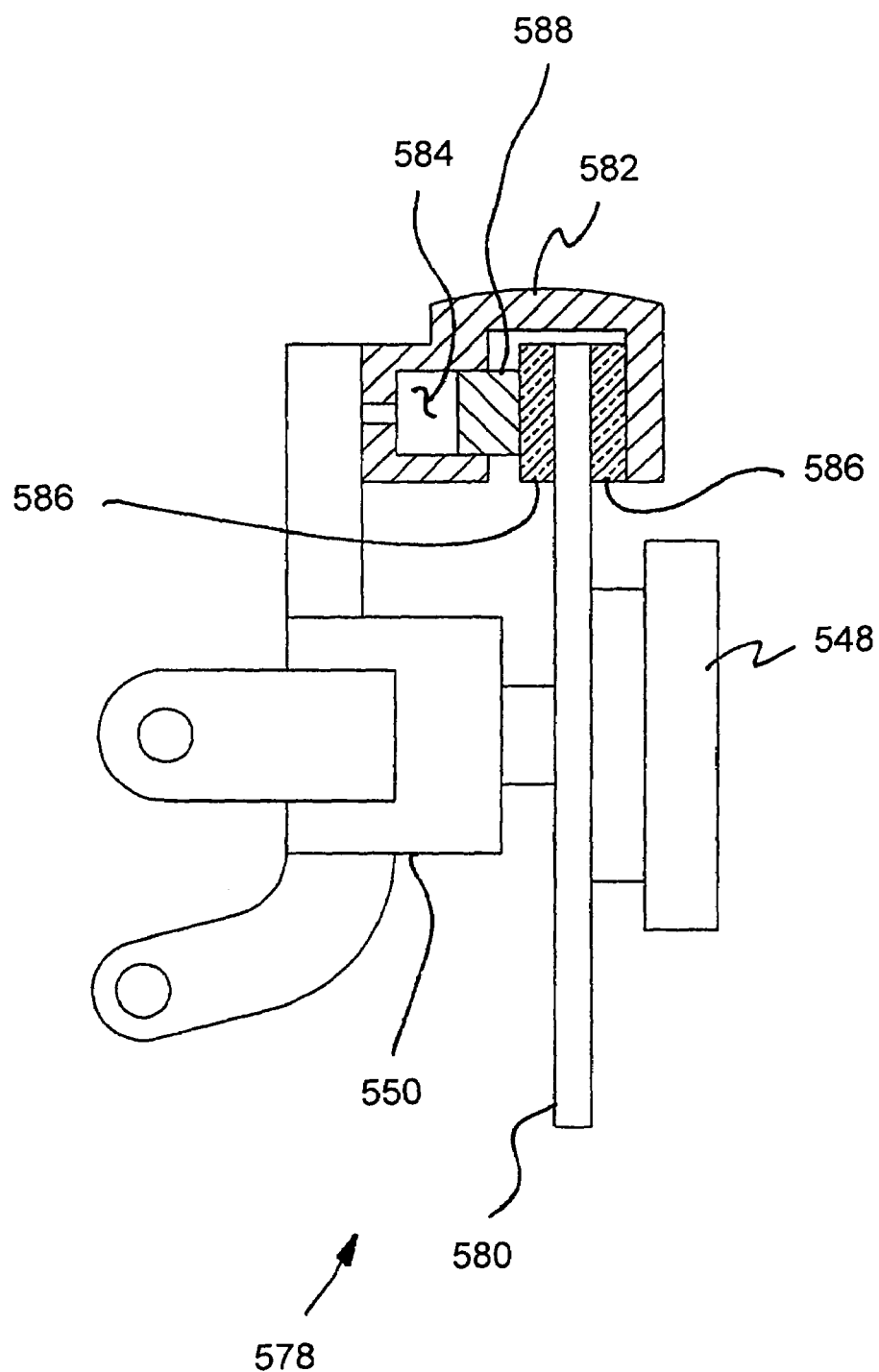
FIG. 6 is a diagrammatic representation of a brake assembly 578 in accordance with an exemplary embodiment of the present invention.

FIG. 6 is a diagrammatic representation of a brake assembly 578 in accordance with an exemplary embodiment of the present invention. Brake assembly 578 of FIG. 6 includes a rotor 580 and a caliper 582. Caliper 582 defines a caliper chamber 584. A caliper piston 588 is disposed within caliper chamber 584. In a preferred embodiment, caliper 582 and caliper piston 588 are arranged to squeeze rotor 580 between two brake pads 586. Rotor 580 is attached to a hub 548 that is rotatably coupled to a wheel carrier 550.

During operation of brake assembly 578, brake pads 586 and rotor 580 may wear due to friction during braking. With reference to FIG. 6, it may be appreciated that as brake pads 586 and brake rotor 580 wear, the volume of fluid disposed in caliper chamber 584 is likely to increase. In some advantageous embodiments of the present invention, fluid is provided by a reservoir to compensate for the wear in the components of brake assembly 578.

Figure 7:
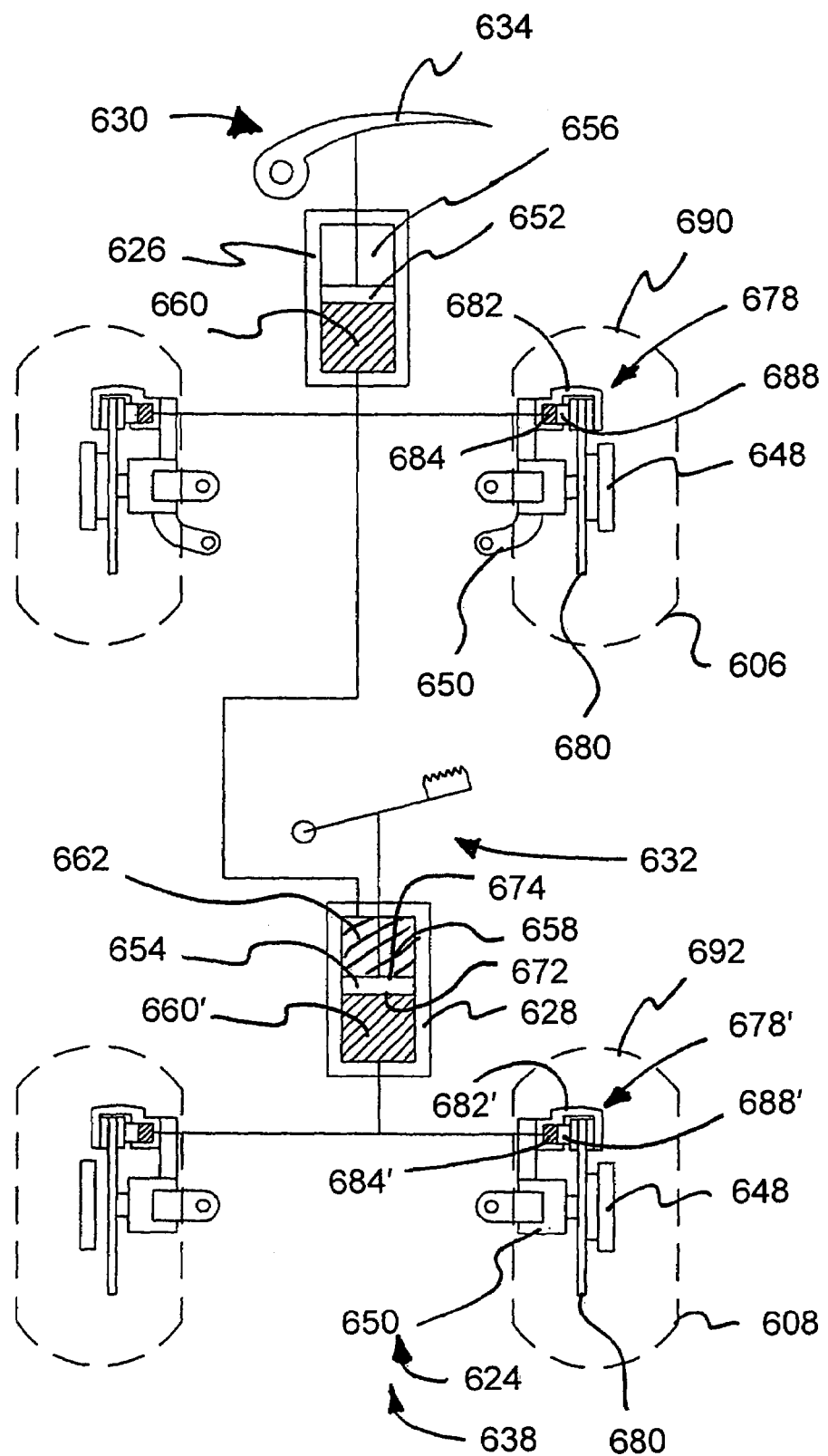
FIG. 7 is a diagrammatic representation of a vehicle 638 in accordance with an exemplary embodiment of the present invention.

FIG. 7 is a diagrammatic representation of a vehicle 638 in accordance with an exemplary embodiment of the present invention. Vehicle 638 includes a first wheel 690 and first brake assembly 678 capable of applying braking force to first wheel 690. Vehicle 638 also includes a second wheel 692 and a second brake assembly 678' capable of applying braking force to second wheel 692.

In the embodiment of FIG. 7, first wheel 690 comprises a front wheel 606 and second wheel 692 comprises a rear wheel 608. In the embodiment of FIG. 7, first wheel 690 and second wheel 692 are each fixed to a hub 648 that is rotatably supported by a wheel carrier 650. Also in the embodiment of FIG. 7, a rotor 680 is attached to each hub 648.

Vehicle 638 includes a braking system 624 comprising a first input mechanism 630. In the embodiment of FIG. 7, the application of force to first input mechanism 630 will actuate first brake assembly 678 and second brake assembly 678' such that a ratio of a second braking force to a first braking-force is equal to a pre-selected braking force ratio. Braking system 624 also includes a second input mechanism 632. In some advantageous implementations of the present invention, the application of force to second input mechanism 632 will vary the ratio of the second braking force to the first braking force.

Braking system 624 comprises a first master piston 652 disposed within a first piston chamber 656 defined by a first piston housing 626. First piston housing 626 has an output chamber 660 defined in part by an output surface of first master piston 652. Braking system 624 also includes a second master piston 654 disposed within a second piston chamber 658 defined by a second piston housing 628.

Second piston housing 628 has an output chamber 660' defined in part by an output surface 672 of second master piston 654 and an input chamber 662 defined in part by an input surface 674 of second master piston 654. In the embodiment of FIG. 7, the output chamber of first piston housing 626 is fluidly connected to input chamber 662 of second piston housing 628 via a conduit.

In the embodiment of FIG. 7, braking system 624 includes a first input mechanism 630. In a preferred embodiment, first input mechanism 630 is capable of applying a first input force to first master piston 652 for producing a first pressure within output chamber 660 of first piston housing 626. Because, in the embodiment of FIG. 7, first piston housing 626 is fluidly connected to input chamber 662 of second piston housing 628 via a conduit, the first pressure is also present in input chamber 662 of second piston housing 628. In the embodiment of FIG. 7, first input mechanism 630 comprises a first lever 634.

First brake assembly 678 of FIG. 7 comprises a caliper 682 that defines a caliper chamber 684. A caliper piston 688 is disposed within caliper chamber 684. Caliper chamber 684 is fluidly connected to output chamber 660 of first piston housing 626. Second brake assembly 678' of FIG. 7 comprises a caliper 682' that defines a caliper chamber 684'. A caliper piston 688' is disposed within caliper chamber 684'. Caliper chamber 684' is fluidly connected to output chamber 660' of second piston housing 628.

Figure 8:
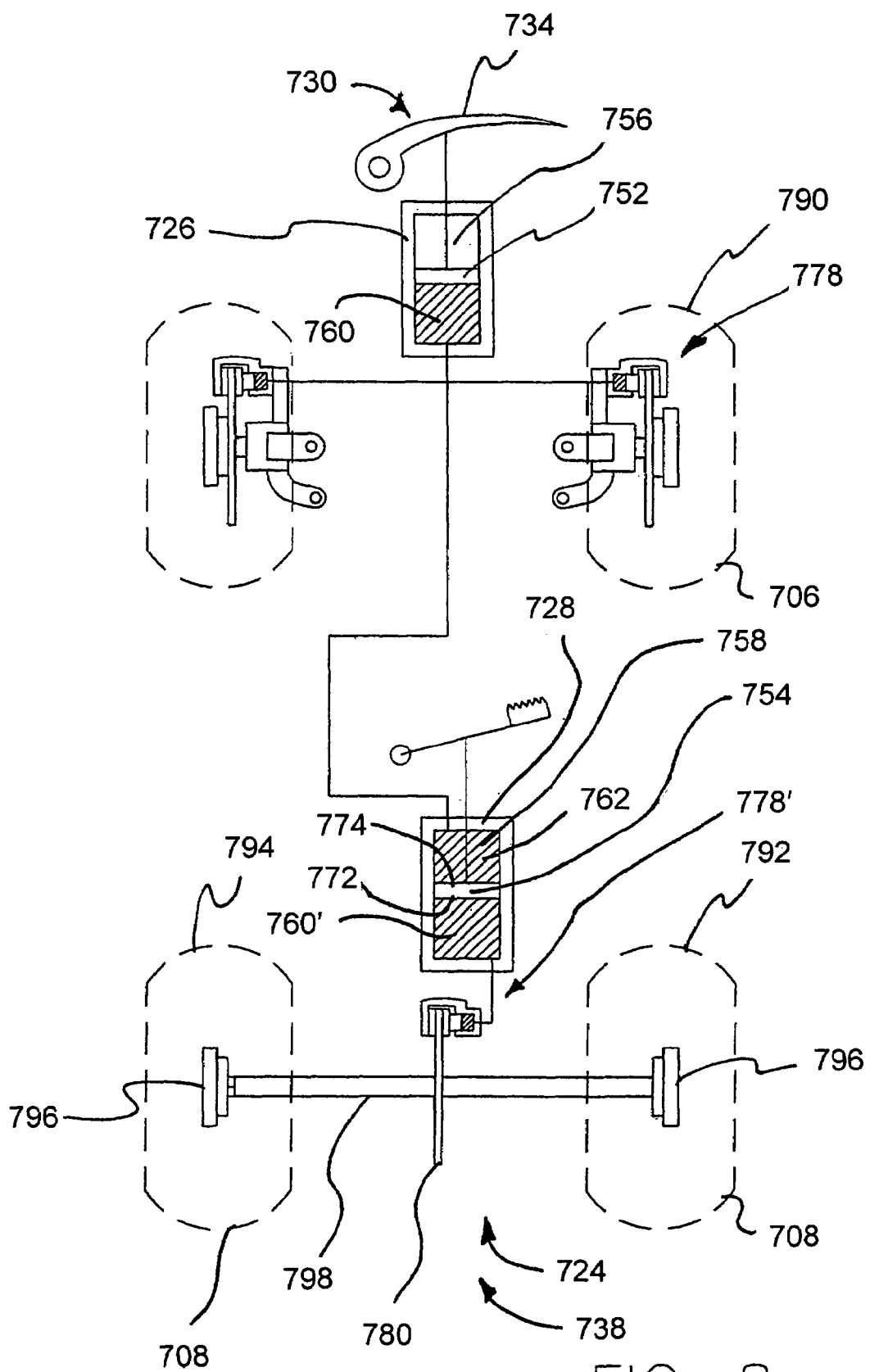
FIG. 8 is a diagrammatic representation of a vehicle 738 in accordance with an exemplary embodiment of the present invention.

FIG. 8 is a diagrammatic representation of a vehicle 738 in accordance with an exemplary embodiment of the present invention. Vehicle 738 includes a first wheel 790 and first brake assembly 778 capable of applying braking force to first wheel 790. Vehicle 738 also includes a second wheel 792 and a third wheel 794. A second brake assembly 778' is capable of applying braking force to second wheel 792 and third wheel 794.

In the embodiment of FIG. 8, first wheel 790 comprises a front wheel 706, while second wheel 792 and third wheel 794 each comprise a rear wheel 708. In the embodiment of FIG. 8, second wheel 792 and third wheel 794 are each fixed to a hub 796 that is fixed to an axle 798. Also in the embodiment of FIG. 8, a rotor 780 is attached to axle 798.

Vehicle 738 includes a braking system 724 comprising a first input mechanism 730. In the embodiment of FIG. 8, the application of force to first input mechanism 730 will actuate first brake assembly 778 and second brake assembly 778' such that a ratio of a second braking force to a first braking force is equal to a pre-selected braking force ratio. Braking system 724 also includes a second input mechanism 732. In some advantageous implementations of the present invention, the application of force to second input mechanism 732 will vary the ratio of the second braking force to the first braking force.

Braking system 724 comprises a first master piston 752 disposed within a first piston chamber 756 defined by a first piston housing 726. First piston housing 726 has an output chamber 760 defined in part by an output surface of first master piston 752. Braking system 724 also includes a second master piston 754 disposed within a second piston chamber 758 defined by a second piston housing 728.

Second piston housing 728 has an output chamber 760' defined in part by an output surface 772 of second master piston 754 and an input chamber 762 defined in part by an input surface 774 of second master piston 754. In the embodiment of FIG. 8, the output chamber of first piston housing 726 is fluidly connected to input chamber 762 of second piston housing 728 via a conduit.

In the embodiment of FIG. 8, braking system 724 includes a first input mechanism 730. In a preferred embodiment, first input mechanism 730 is capable of applying a first input force to first master piston 752 for producing a first pressure within output chamber 760 of first piston housing 726. Because, in the embodiment of FIG. 8, first piston housing 726 is fluidly connected to input chamber 762 of second piston housing 728 via a conduit, the first pressure is also present in input chamber 762 of second piston housing 728. In the embodiment of FIG. 8, first input mechanism 730 comprises a first lever 734.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:
1. A vehicle comprising:
at least one front wheel and at least one rear wheel;
a front brake assembly operatively connected to the at least one front wheel;
a rear brake assembly operatively connected to the at least one rear wheel;
a first brake input mechanism configured to be manually manipulated by a vehicle rider;
a first reservoir for supplying fluid to the first brake input mechanism and for compensating for wear in the front brake assembly;
a second brake input mechanism configured to be manually manipulated by a vehicle rider and fluidly coupled to the first brake input mechanism;
a second reservoir for supplying fluid to the second brake input mechanism and for compensating for wear in the rear brake assembly;
wherein displacing the first brake input mechanism causes the front brake assembly to apply a front braking force to the at least one front wheel and displaces the second brake input mechanism to actuate the rear brake assembly to apply a rear braking force to the at least one rear wheel; and
wherein displacing the second brake input mechanism causes the rear brake assembly to apply a rear braking force to the at least one rear wheel.

2. The vehicle of claim 1, wherein the first brake input mechanism is positioned and dimensioned to receive a first hand of a vehicle rider and the second brake input mechanism is positioned and dimensioned to receive a second hand of the vehicle rider.

3. The vehicle of claim 1, wherein the first brake input mechanism is positioned and dimensioned to receive a hand of a vehicle rider and the second brake input mechanism is positioned and dimensioned to receive a foot of the vehicle rider.

4. The vehicle of claim 1, wherein the vehicle comprises more than one front wheel.

5. The vehicle of claim 1, wherein the vehicle comprises more than one rear wheel.

6. The vehicle of claim 1, wherein the front brake assembly comprises a rotor coupled to the at least one front wheel and a brake caliper capable of pinching the rotor between two or more brake pads.

7. The vehicle of claim 1, wherein an output chamber of the first brake input mechanism is hydraulically coupled to a caliper chamber of a brake caliper.

8. The vehicle of claim 1, wherein the rear brake assembly comprises a rotor coupled to the at least one rear wheel and a brake caliper capable of pinching the rotor between two or more brake pads.

9. The vehicle of claim 1, wherein an output chamber of the second brake input mechanism is hydraulically coupled to a caliper chamber of a brake caliper.

10. The vehicle of claim 1, wherein an output chamber of the first brake input mechanism is hydraulically coupled to an input chamber of the second brake input mechanism.

11. A vehicle comprising:
at least one front wheel and at least one rear wheel;
a front brake assembly operatively connected to the at least one front wheel;
a rear brake assembly operatively connected to the at least one rear wheel;
a first brake input mechanism including a user input member configured to be manually manipulated by a vehicle rider, and a first brake piston housing receiving a first master piston defining an output chamber fluidly coupled to the front brake assembly;
a second brake input mechanism including a user input member configured to be manually manipulated by a vehicle rider, and a second brake piston housing receiving a second master piston defining an output chamber fluidly coupled to the rear brake assembly, the second brake piston housing having an input chamber defined by the second master piston and fluidly coupled in series with the output chamber of the first brake piston housing;
wherein actuation of the user input member of the first brake input mechanism displaces the first master piston to cause actuation of the front brake assembly and displaces the second master piston to cause actuation of the rear brake assembly; and
wherein actuation of the user input member of the second brake input mechanism displaces the second master piston to cause actuation of the rear brake assembly.

12. The vehicle of claim 11, further comprising:
a first reservoir for supplying fluid to the first brake piston housing of the first brake input mechanism and for compensating for wear in the front brake assembly; and
a second reservoir for supplying fluid to the second brake piston housing of the second brake input mechanism and for compensating for wear in the rear brake assembly.

13. The vehicle of claim 11, wherein the user input member of the first brake input mechanism is positioned and dimensioned to receive a first hand of a vehicle rider and the user input member of the second brake input mechanism is positioned and dimensioned to receive a second hand of the vehicle rider.

14. The vehicle of claim 11, wherein the user input member of the first brake input mechanism is positioned and dimensioned to receive a hand of a vehicle rider and the user input member of the second brake input mechanism is positioned and dimensioned to receive a foot of the vehicle rider.

15. The vehicle of claim 11, wherein the front brake assembly comprises a rotor coupled to the at least one front wheel and a brake caliper capable of pinching the rotor between two or more brake pads.

16. The vehicle of claim 11, wherein the output chamber of the first brake input mechanism is hydraulically coupled to a caliper chamber of a brake caliper.

17. The vehicle of claim 11, wherein the rear brake assembly comprises a rotor coupled to the at least one rear wheel and a brake caliper capable of pinching the rotor between two or more brake pads.

18. The vehicle of claim 11, wherein the output chamber of the second brake input mechanism is hydraulically coupled to a caliper chamber of a brake caliper.

19. The vehicle of claim 11, wherein actuation of the front brake assembly results in a front braking force being applied to the at least one front wheel.

20. The vehicle of claim 11, wherein actuation of the rear brake assembly results in a rear braking force being applied to the at least one rear wheel.

21. A vehicle comprising:
at least one front wheel and at least one rear wheel;
a front brake assembly operatively connected to the at least one front wheel;
a rear brake assembly operatively connected to the at least one rear wheel;
a first brake input mechanism including a first brake piston housing fluidly coupled to the front brake assembly, and a user input member operably coupled to the first brake piston housing and configured to be manually manipulated by a vehicle rider;
a second brake input mechanism including a second brake piston housing fluidly coupled to the rear brake assembly, and a user input member operably coupled to the second brake piston housing and configured to be manually manipulated by a vehicle rider, the second brake piston housing being fluidly coupled in series with the first brake piston housing;
wherein actuation of the first brake input mechanism causes actuation of the front brake assembly and causes actuation of the rear brake assembly;
wherein actuation of the second brake input mechanism causes actuation of the rear brake assembly;
a first reservoir for supplying fluid to the first brake piston housing of the first brake input mechanism and for compensating for wear in the front brake assembly; and
a second reservoir for supplying fluid to the second brake piston housing of the second brake input mechanism and for compensating for wear in the rear brake assembly.

22. The vehicle of claim 21, wherein the user input member of the first brake input mechanism is positioned and dimensioned to receive a first hand of a vehicle rider and the user input member of the second brake input mechanism is positioned and dimensioned to receive a second hand of the vehicle rider.

23. The vehicle of claim 21, wherein the user input member of the first brake input mechanism is positioned and dimensioned to receive a hand of a vehicle rider and the user input member of the second brake input mechanism is positioned and dimensioned to receive a foot of the vehicle rider.

24. The vehicle of claim 21, wherein the front brake assembly comprises a rotor coupled to the at least one front wheel and a brake caliper capable of pinching the rotor between two or more brake pads.

25. The vehicle of claim 21, wherein an output chamber of the first brake input mechanism is hydraulically coupled to a caliper chamber of a brake caliper.

26. The vehicle of claim 21, wherein the rear brake assembly comprises a rotor coupled to the at least one second wheel and a brake caliper capable of pinching the rotor between two or more brake pads.

27. The vehicle of claim 21, wherein an output chamber of the second brake input mechanism is hydraulically coupled to a caliper chamber of a brake caliper.

28. The vehicle of claim 21, wherein an output chamber of the first brake input mechanism is hydraulically coupled to an input chamber of the second brake input mechanism.

29. The vehicle of claim 21, wherein actuation of the front brake assembly results in a front braking force being applied to the at least one front wheel.

30. The vehicle of claim 21, wherein actuation of the rear brake assembly results in a rear braking force being applied to the at least one rear wheel.

31. A vehicle comprising:

at least one front wheel and at least one rear wheel;

a front brake assembly operatively connected to the at least one front wheel;

a rear brake assembly operatively connected to the at least one rear wheel;

a first brake input mechanism including a first brake piston housing receiving a first master piston defining an output chamber fluidly coupled to the front brake assembly;

a second brake input mechanism including a second brake piston housing receiving a second master piston defining an output chamber fluidly coupled to the rear brake assembly, the second brake piston housing having an input chamber defined by the second master piston and fluidly coupled in series with the output chamber of the first brake piston housing;

wherein actuation of the first brake input mechanism displaces the first master piston to cause actuation of the front brake assembly and displaces the second master piston to cause actuation of the rear brake assembly;

wherein actuation of the second brake input mechanism displaces the second master piston to cause actuation of the rear brake assembly;

a first reservoir for supplying fluid to the first brake piston housing of the first brake input mechanism and for compensating for wear in the front brake assembly; and a second reservoir for supplying fluid to the second brake piston housing of the second brake input mechanism and for compensating for wear in the rear brake assembly.

32. The vehicle of claim 31, wherein the first brake input mechanism is positioned and dimensioned to receive a first hand of a vehicle rider and the second brake input mechanism is positioned and dimensioned to receive a second hand of the vehicle rider.

33. The vehicle of claim 31, wherein the first brake input mechanism is positioned and dimensioned to receive a hand of a vehicle rider and the second brake input mechanism is positioned and dimensioned to receive a foot of the vehicle rider.

34. The vehicle of claim 31, wherein the front brake assembly comprises a rotor coupled to the at least one front wheel and a brake caliper capable of pinching the rotor between two or more brake pads.

35. The vehicle of claim 31, wherein the output chamber of the first brake input mechanism is hydraulically coupled to a caliper chamber of a brake caliper.

36. The vehicle of claim 31, wherein the rear brake assembly comprises a rotor coupled to the at least one rear wheel and a brake caliper capable of pinching the rotor between two or more brake pads.

37. The vehicle of claim 31, wherein the output chamber of the second brake input mechanism is hydraulically coupled to a caliper chamber of a brake caliper.

38. The vehicle of claim 31, wherein actuation of the front brake assembly results in a front braking force being applied to the at least one front wheel.

39. The vehicle of claim 31, wherein actuation of the rear brake assembly results in a rear braking force being applied to the at least one rear wheel.

* * * * *